(12) United States Patent
Smeja

(10) Patent No.: US 10,883,271 B2
(45) Date of Patent: Jan. 5, 2021

(54) ROOF MOUNTING BRACKET

(71) Applicant: Sno-Gem, Inc., McHenry, IL (US)

(72) Inventor: Michael V. Smeja, Inverness, IL (US)

(73) Assignee: Sno-Gem, Inc., McHenry, IL (US)

( * ) Notice: Subject to any disclaimer, the term of this patent is extended or adjusted under 35 U.S.C. 154(b) by 413 days.

(21) Appl. No.: 14/476,664

(22) Filed: Sep. 3, 2014

(65) Prior Publication Data

US 2015/0060620 A1    Mar. 5, 2015

Related U.S. Application Data

(60) Provisional application No. 61/873,204, filed on Sep. 3, 2013, provisional application No. 61/893,028, filed on Oct. 18, 2013.

(51) Int. Cl.
*E02D 13/10* (2006.01)
*F24S 25/615* (2018.01)
(Continued)

(52) U.S. Cl.
CPC .............. *E04D 13/00* (2013.01); *E04D 13/10* (2013.01); *F24S 25/615* (2018.05);
(Continued)

(58) Field of Classification Search
CPC ......... E04D 3/362; E04D 13/00; E04D 13/10; F24J 2/5249; F24J 2002/4663
(Continued)

(56) References Cited

U.S. PATENT DOCUMENTS 3,302,353 A * 2/1967 Du Pradal ............... E04D 3/362
                                                           52/395
5,613,328 A * 3/1997 Alley ...................... E04D 13/10
                                                            52/24
(Continued)

*Primary Examiner* — Kyle J. Walraed-Sullivan
(74) *Attorney, Agent, or Firm* — Barnes & Thornburg LLP; Lawrence James

(57) ABSTRACT

A roof mounting bracket is disclosed which creates a deformation in a roof panel seam using opposing set points. In a preferred embodiment, a generally U-shaped bracket includes two or more threaded fasteners in a first arm of the bracket and one or more opposing threaded fasteners in the second arm. Void in bracket is placed over the panel seam, with the first arm on a first side of the seam and the second arm on the opposite side of the seam. First screws inserted into the fasteners in first arm pass through the first arm and the first screw heads contact the first side of the seam, slightly engaging the seam and creating first deformations in the seam as the set screws are tightened. Second screws inserted into the fasteners in the second arm pass through the second arm and the second screw heads contact the second side of the seam in the spaces between the first deformations on the opposite side of the seam, engaging the seam and creating second deformations in the seam as the second screws are tightened. The opposing contact points create a "wave" deformation in the seam, securing the bracket to the seam. The opposing set points of the present invention allow secure attachment of the bracket to the seam without having to "dimple" or dent the panel seam using a single set screw, requiring less force by the user. Bracket can include varying numbers of opposing fasteners in first and second arms for varying numbers of opposing set points. In an alternative embodiment, bracket can further comprise divots into which first deformations are recesses to create a deeper "wave" the seam for stronger attachment to seam.

17 Claims, 14 Drawing Sheets

(51) Int. Cl.
*E04D 13/00* (2006.01)
*E04D 13/10* (2006.01)
*F24S 25/60* (2018.01)

(52) U.S. Cl.
CPC ....... *F24S 2025/6003* (2018.05); *Y02B 10/20* (2013.01); *Y02E 10/47* (2013.01)

(58) Field of Classification Search
USPC .................................. 52/24, 25, 26, 545
See application file for complete search history.

(56) References Cited

U.S. PATENT DOCUMENTS

| | | | | |
|---|---|---|---|---|
| 6,318,028 B2* | 11/2001 | Alley | ............ | E04D 13/10 411/432 |
| 6,499,259 B1* | 12/2002 | Hockman | ............ | E04D 13/10 52/24 |
| 6,536,166 B1* | 3/2003 | Alley | ............ | E04D 13/10 411/432 |
| 6,688,047 B1* | 2/2004 | McNichol | ............ | E04D 13/10 52/25 |
| 6,834,466 B2* | 12/2004 | Trevorrow | ............ | E04D 13/10 248/512 |
| 7,013,612 B2* | 3/2006 | Haddock | ............ | E04D 3/3608 52/528 |
| 7,386,922 B1* | 6/2008 | Taylor | ............ | E04D 13/10 24/525 |
| 7,487,617 B2* | 2/2009 | Hockman | ............ | E04D 13/10 248/535 |
| 7,513,080 B1* | 4/2009 | Showalter | ............ | E04D 13/10 403/373 |
| 7,703,256 B2* | 4/2010 | Haddock | ............ | F16B 2/10 52/24 |
| D629,679 S* | 12/2010 | Riddell | ............ | D8/394 |
| D658,977 S* | 5/2012 | Riddell | ............ | D8/394 |
| 8,312,678 B1* | 11/2012 | Haddock | ............ | E04D 12/004 52/101 |
| 8,925,263 B2* | 1/2015 | Haddock | ............ | F24J 2/5254 136/251 |
| 9,147,785 B2* | 9/2015 | Haddock | ............ | H02S 20/00 |
| 9,695,848 B2* | 7/2017 | Thompson | ............ | F16B 2/065 |
| 2002/0088196 A1* | 7/2002 | Haddock | ............ | E04D 3/3608 52/543 |
| 2004/0055233 A1* | 3/2004 | Showalter | ............ | E04D 13/10 52/223.13 |
| 2005/0102958 A1* | 5/2005 | Anderson | ............ | E04D 13/10 52/698 |
| 2005/0193649 A1* | 9/2005 | Hockman | ............ | E04D 13/10 52/198 |
| 2005/0193650 A1* | 9/2005 | Hockman | ............ | E04D 13/10 52/198 |
| 2005/0257434 A1* | 11/2005 | Hockman | ............ | E04D 13/10 52/24 |
| 2007/0051053 A1* | 3/2007 | Hockman | ............ | E04D 13/10 52/25 |
| 2008/0302928 A1* | 12/2008 | Haddock | ............ | E04F 13/0821 248/205.1 |
| 2010/0058701 A1* | 3/2010 | Yao | ............ | E04D 13/12 52/547 |
| 2010/0083588 A1* | 4/2010 | Hockman | ............ | E04D 13/10 52/24 |
| 2010/0284737 A1* | 11/2010 | McPheeters | ............ | E04D 13/1476 403/374.3 |
| 2011/0214368 A1* | 9/2011 | Haddock | ............ | F24J 2/5249 52/173.3 |
| 2011/0247292 A1* | 10/2011 | Li | ............ | F24J 2/5205 52/698 |
| 2012/0267490 A1* | 10/2012 | Haddock | ............ | F24J 2/5249 248/221.11 |
| 2012/0299233 A1* | 11/2012 | Header | ............ | E04D 13/10 269/91 |
| 2012/0304556 A1* | 12/2012 | Teller | ............ | E04D 13/10 52/173.1 |
| 2013/0145711 A1* | 6/2013 | Haddock | ............ | E04F 13/0821 52/478 |
| 2013/0161462 A1* | 6/2013 | Haddock | ............ | F16M 13/02 248/237 |
| 2013/0168525 A1* | 7/2013 | Haddock | ............ | E04D 13/10 248/505 |
| 2013/0192150 A1* | 8/2013 | DuPont | ............ | F24J 2/5203 52/173.3 |
| 2014/0086680 A1* | 3/2014 | Header | ............ | E04D 13/10 403/374.3 |
| 2014/0102016 A1* | 4/2014 | Hemingway | ............ | F24J 2/5256 52/173.3 |
| 2014/0109496 A1* | 4/2014 | Stapleton | ............ | E04D 13/00 52/173.3 |

* cited by examiner

ROOF MOUNTING BRACKET

CROSS-REFERENCE TO RELATED APPLICATIONS

This application claims priority from U.S. Provisional Patent Application No. 61/873,204, filed on Sep. 3, 2013, and U.S. Provisional Patent Application No. 61/893,028, filed on Oct. 18, 2013, both of which are incorporated herein by reference.

BACKGROUND

Roof mounting systems are used to attach various structures to roofs, such as snow barricades, solar panels, lightening protection, mechanical equipment and other accessories such as signage and poles. Roof mounting systems are known for attaching to various types of roofs and roofing materials, including seamed or metal roofs, wood roofs and membranous roofs. Due to the weight of, or weight that must be supported by, such structures, and to the need for the structures to remain stable in weather conditions, the secure attachment of the structures to the roofs is critical. In the case of seamed roofs, where roof mounting systems are attached to panel seams of the roof, the brackets or clamps are secured to the panel seams and serve as the support for the attached structures. Existing brackets comprise two-piece brackets that must be secured to each other around the panel seams, requiring additional parts during installation. Other existing bracket systems comprise a single piece, but to secure the bracket to the panel seam the user must create a dimple in the panel seam metal using a screw; these brackets requiring a large amount of torque to be applied by the installing user.

SUMMARY

The present invention solves the existing limitations. The present invention relates to a roof mounting bracket for mounting roof systems and accessories to panel seam roofs. In particular, the present invention provides a roof mounting bracket for use with panel seam roofs, wherein the bracket creates a deformation or distortion in the panel seam using opposing set points to secure the bracket to the panel seam.

A roof mounting bracket is disclosed which creates a deformation in a roof panel seam using opposing set points. In a preferred embodiment, a generally U-shaped bracket includes two or more projections, such as threaded fasteners or screws, in a first arm of the bracket and one or more opposing projections, such as threaded fasteners or screws, in the second arm. The void or channel in the bracket is placed over the panel seam, with the first arm on a first side of the seam and the second arm on the opposite side of the seam. First screws inserted into the fasteners in first arm pass through the first arm and the first screw heads contact the first side of the seam, slightly engaging the seam and creating first deformations in the seam as the set screws are tightened. Second screws inserted into the fasteners in the second arm pass through the second arm and the second screw heads contact the second side of the seam in the spaces between the first deformations on the opposite side of the seam, engaging the seam and creating second deformations in the seam as the second screws are tightened. The opposing contact points create a "wave"-like deformation in the seam, securing the bracket to the seam. The opposing set points of the present invention allow secure attachment of the bracket to the seam without having to "dimple" or dent the panel seam using a single set screw, requiring less force by the user. Many other clamps that utilize multiple set screws are secured by using high torques on the screws to create a compression or friction-type attachment. These high torques can have the tendency to damage and mar the paint finish or even pierce the panel. The existing invention deforms the panel metal material by using a single set screw to push the metal in between two other set screws and/or set positioning points, creating a wave which will keep the clamp from sliding while achieving the same or greater security with less torque than existing clamps.

Bracket can include varying numbers of opposing fasteners in first and second arms for varying numbers of opposing set points. Bracket can also include, on the underside of the top wall, a notch for aligning the panel seam within the void.

In an alternative embodiment, bracket is comprised of first and second members. The first member comprises two or more posts and the second member comprises corresponding receiving channels. Posts create first deformations in the panel seam 44 as first screws are tightened and deformations are set into receiving channels to secure first and second members together around the seam. The second member includes a third fastener through which second screw passes, and as the second screw is tightened, the screw head engages the seam in the space between the deformations on the opposite side of the seam, engaging the seam and creating a second deformation in the seam as the screw is tightened.

In a further embodiment, bracket can includes two or more divots on the inside of the first arm. The divots are positioned opposite the threaded fasteners of the second arm and are shaped correspond to heads of screws threaded through fasteners, such that when the screws are tightened to create the first deformations in panel, the first deformations are reset into the divots to create a more secure attachment of the bracket to the panel. A second screw is then inserted into a fastener of the first arm and threaded therethrough until the head of the screw contacts the opposing side of the seam in the space between the first deformations, engaging the seam and creating a second opposing deformation in the seam as the screw second is tightened to create the "wave"-shaped distortion in the seam, securing the bracket to the seam. It is further contemplated that this embodiment of the bracket can include varying numbers of fasteners in arms of bracket and varying numbers of corresponding divots for creating additional wave deformations in panel seam using additional opposing screws.

In a further alternative embodiment, bracket can include an extrusion portion extending from the first arm into the opening between the first arm and the second arm to aid in centering the bracket on the seam, and the extrusion portion can be shaped to fit varying configurations of seams. In yet a further contemplated embodiment, bracket may include a lip extending from first arm the second arm which can hook under a portion of the panel seam to prevent the bracket from riding up the seam as the opposing screws are torqued to create the first deformations and opposing "wave" deformation.

Other objects, advantages, features, properties and relationships of the invention will be obtained from the following detailed description and accompanying drawings which set forth illustrative embodiments that are indicative of the various ways in which the principles of the invention may be employed.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
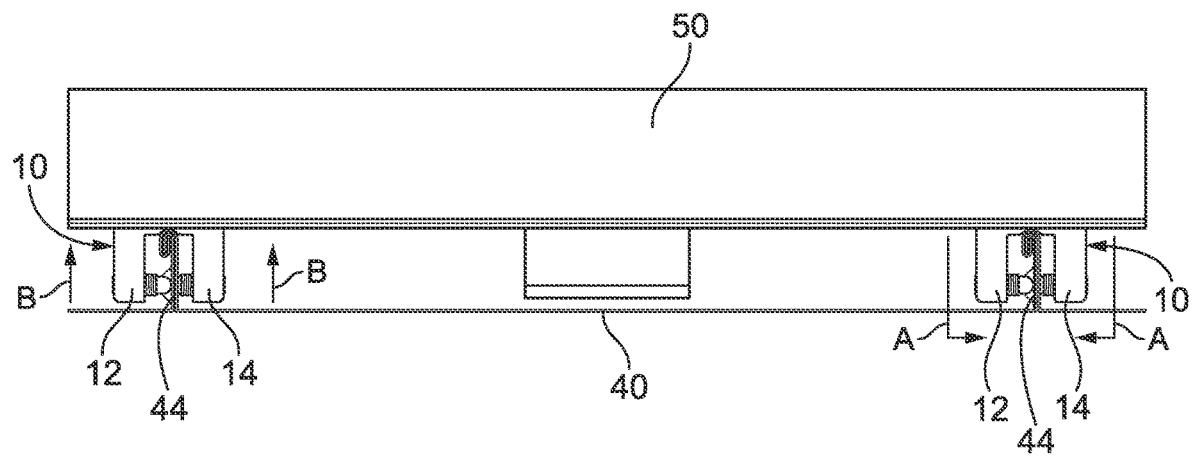
FIG. 1 is a front view of one embodiment of a roof mounting bracket in accordance with the present invention, showing two roof mounting brackets installed on two panels of a roof and a snow guard coupled to the brackets.
Figure 2:
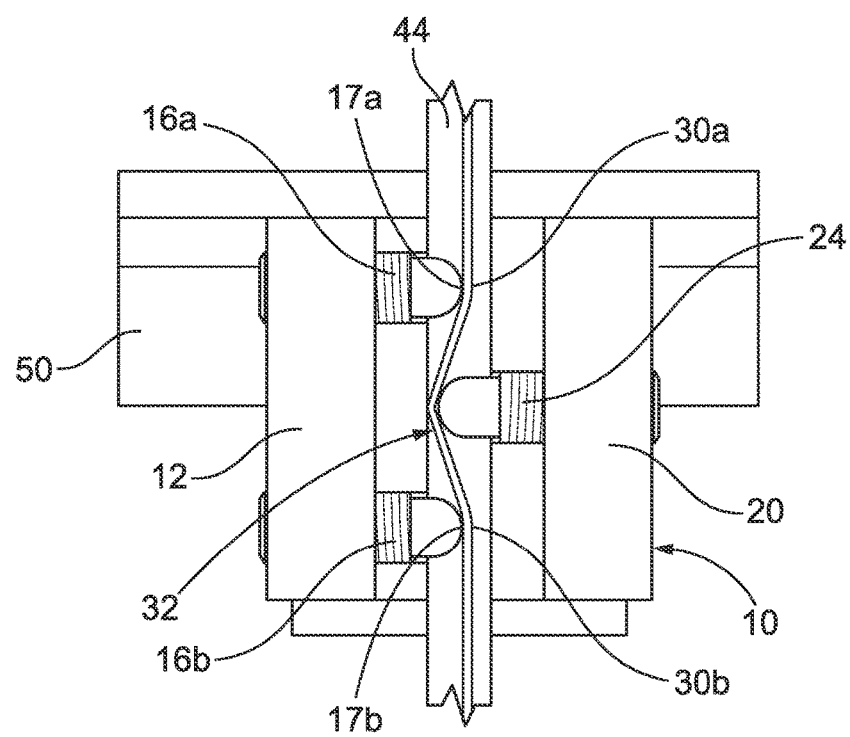
FIG. 2 is a cross-sectional view along line B-B of FIG. 1 showing a roof mounting bracket installed on a roof panel.

FIGS. 1-8 show a preferred embodiment of a roof mounting bracket 10. FIG. 1 shows one embodiment of a roof mounting bracket 10 mounted on a metal panel roof. In this embodiment, bracket 10 can be installed on roofs having varying panel and seam configurations, but is generally installed onto the seam 44 of a roof panel 40 and secured to seam 44 by creating deformations 30a and 30b, 32 in the seam 44 using opposing screws 16a and 16b, 24. In one embodiment, shown in FIGS. 2-4, the bracket 10 is a generally U-shaped bracket having a first arm 12 and a second arm 20 with a void between the first arm 12 and the second arm 20. First arm 12 comprises two threaded fasteners 14a, 14b and second arm 20 comprises one threaded fastener 22. The threaded fastener 22 of the second arm 20 is positioned opposite the space between the opposing threaded fasteners 14a, 14b of the first arm 12.

In a preferred embodiment, the bracket 10 is manufactured by aluminum extruding. Secondary operations are required to cut, drill, tap, machine and stamp a logo with various tools such as a CNC machine. Each part will then be put through a process called tumbling to create a smooth finish.

Figure 3:
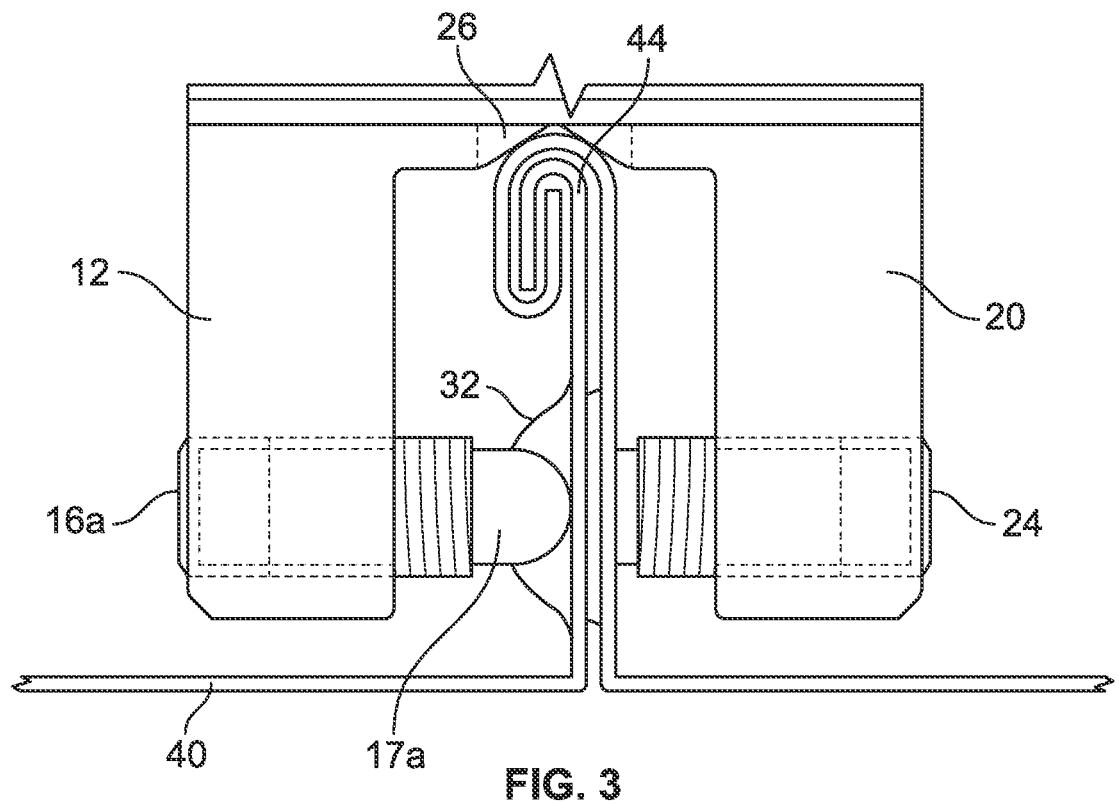
FIG. 3 is a front detail view along line A-A of FIG. 1 showing a roof mounting bracket installed on a roof panel.

To secure the bracket 10 to the panel 40, the void in the bracket 10 is placed over the seam 44 with the first arm 12 on a first side of the seam 44 and the second arm 20 on the opposite side of the seam 44, as shown in FIG. 3. First screws 16a, 16b are inserted into fasteners 14a, 14b and threaded therethrough until the heads 17a, 17b contact the seam 44, slightly engaging the seam 44 and creating first deformations 30a, 30b in the seam 44 as the screws 16a, 16b are tightened. Second screw 24 is then inserted into the fastener 22 and threaded therethrough until the head 25 contacts the opposing side of seam 44 in the space between the first deformations 30a, 30b, engaging the seam 44 and creating a second opposing deformation 32 in the seam 44 as the screw 24 is tightened. The opposing deformations 30a, 30b and 32 create a "wave"-shaped distortion in the seam 44, securing the bracket 10 to the seam 44. The opposing deformations 30a, 30b and 32 of the present invention allow secure attachment of the bracket 10 to the seam 44 without having to "dimple" or dent the seam 44 using a single set screw, requiring less force by the user. A preferred embodiment comprises threaded fasteners 14a, 14b and 22 aligned the same height on arms 12 and 14 such that opposing deformations 30a, 30b and 32 created by screws 16a, 16b and 24 are in a generally straight line. However, variations in alignment of deformations 30a, 30b and 32 are also contemplated.

Figure 4:
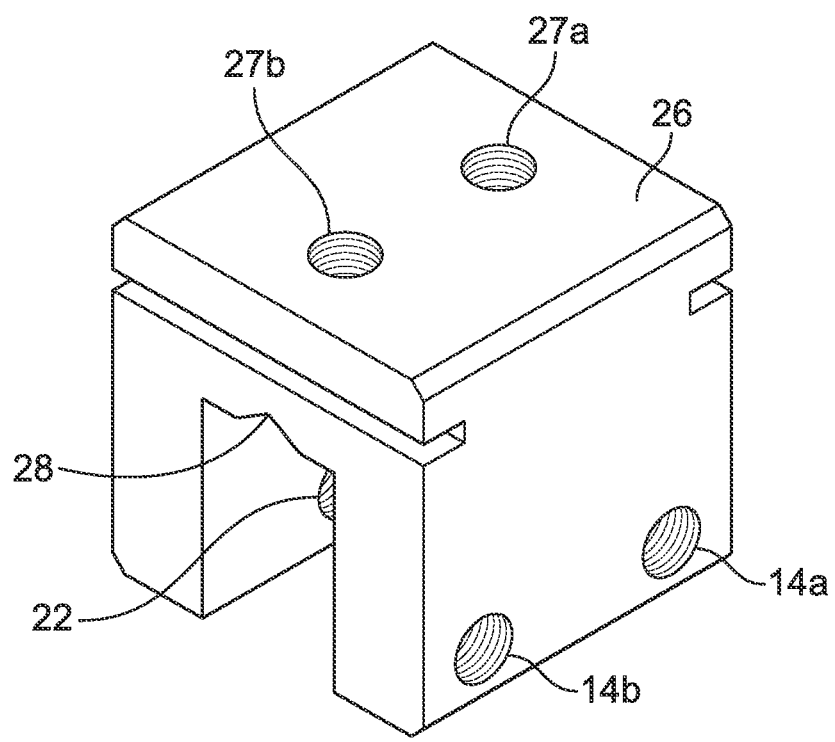
FIG. 4 is a perspective view of one embodiment of a roof mounting bracket in accordance with the present invention.
Figure 5:
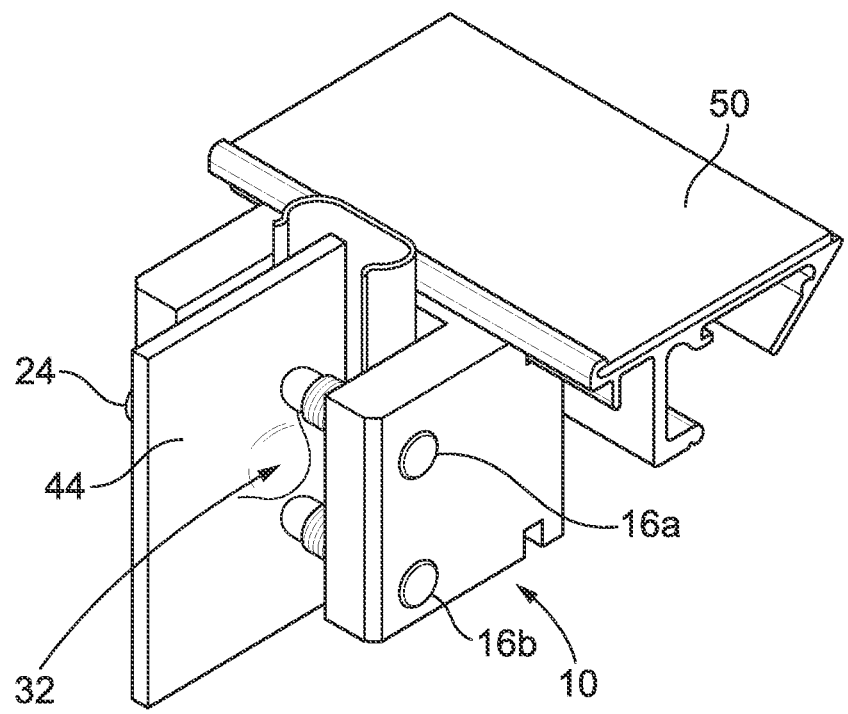
FIG. 5 is a side perspective view of one embodiment of a roof mounting bracket installed on a roof panel and further including a snow barricade coupled to bracket.
Figure 6:
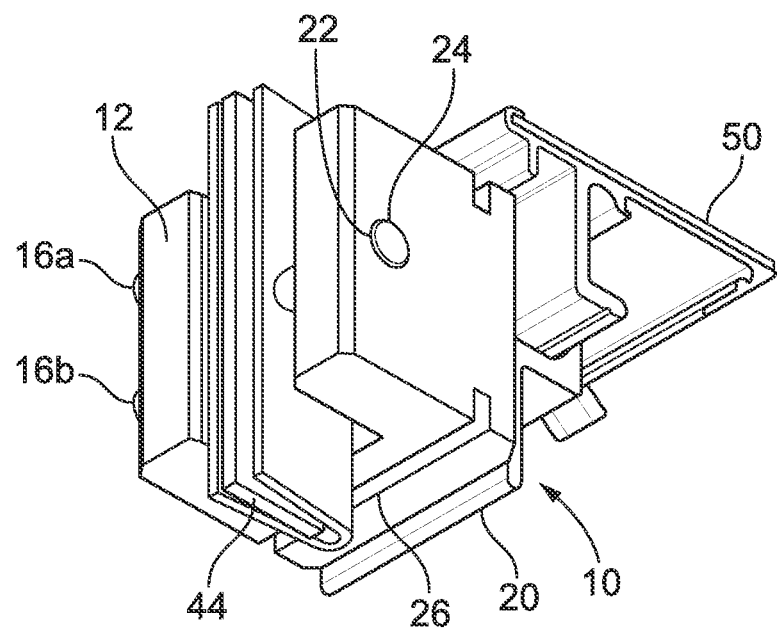
FIG. 6 is a bottom perspective view of one embodiment of a roof mounting bracket installed on a roof panel and further including a snow barricade coupled to bracket.
Figure 7:
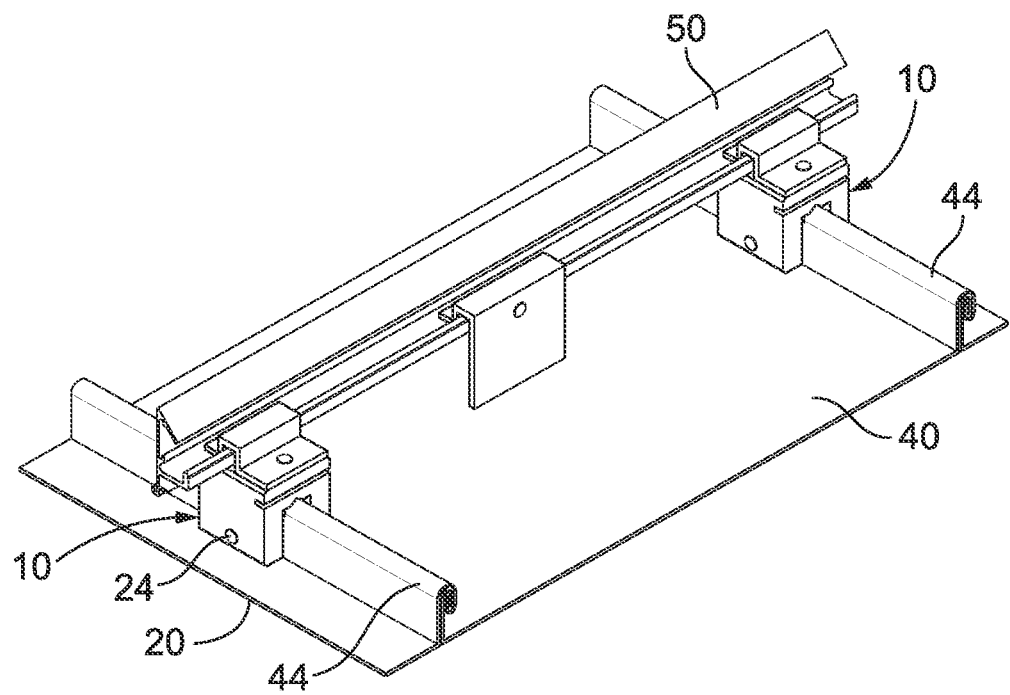
FIG. 7 is a front perspective view of one embodiment of a roof mounting bracket in accordance with the present invention, showing two roof mounting brackets installed on two panels of a roof and further including a snow barricade coupled to the brackets.
Figure 8:
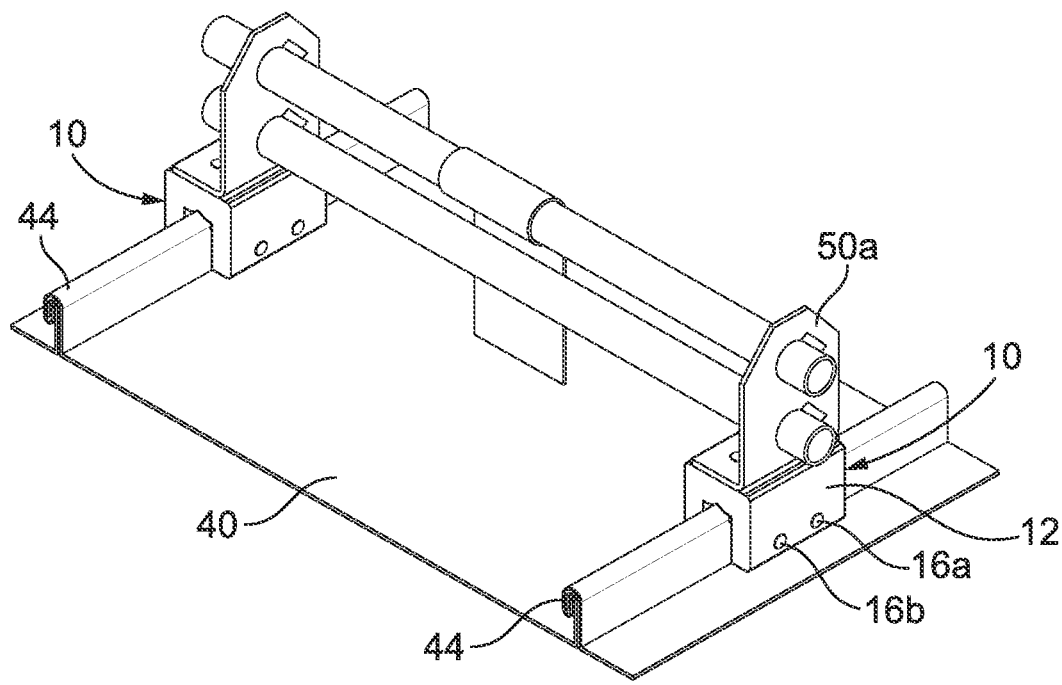
FIG. 8 is a rear perspective view of one embodiment of a roof mounting bracket in accordance with the present invention, showing two roof mounting brackets installed on two panels of a roof and further including a snow barricade coupled to the brackets.

Bracket 10 can be used in numerous applications for installing accessories to roofs. As seen in FIG. 4, top wall 26 can include one or more fasteners 27a, 27b for securing accessories to bracket 10. As seen in FIGS. 1-2 and FIGS. 5-8, various snow barricades 50, 50a can be mounted to bracket 10 for retaining snow behind barricade 50, 50a. Other accessories (not shown), such as solar panels, antennas, mounting poles, lightening protection equipment, mechanical equipment and other similar accessories known in the art can also be secured to bracket 10. Bracket 10 may alternatively include varying numbers of fasteners to accommodate various accessories. In a further alternative (not shown) set positioning points integral to one arm clamp could be used instead of screws.

Figure 9:
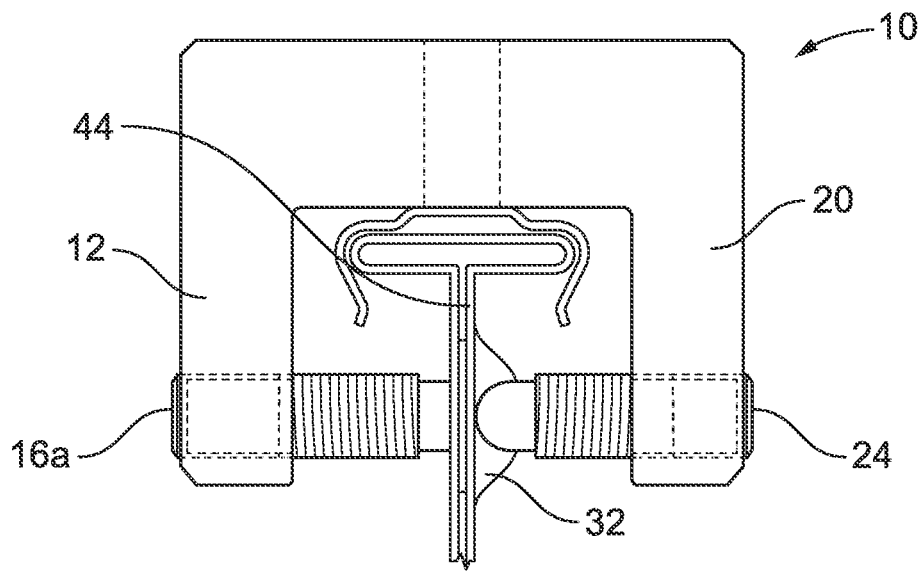
FIG. 9 is a front detail view of another embodiment of a roof mounting bracket installed on an alternative roof panel.
Figure 10:
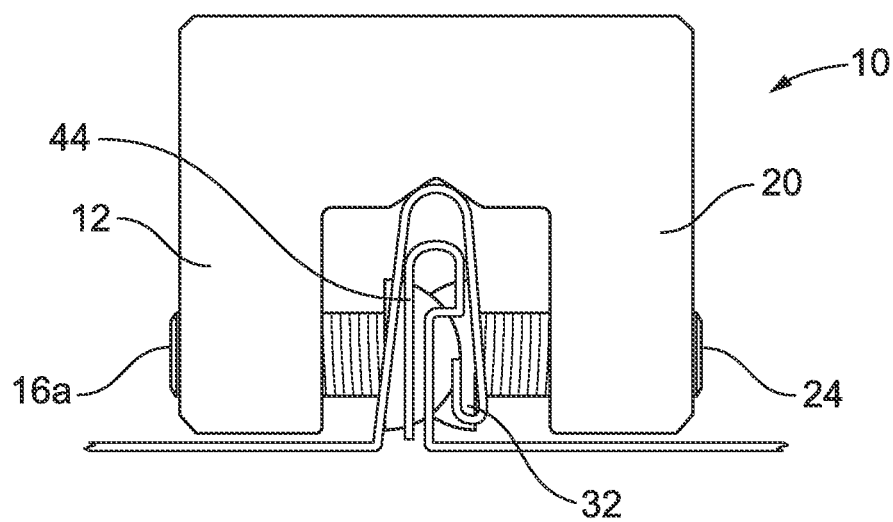
FIG. 10 is a front detail view of another embodiment of a roof mounting bracket installed on an alternative roof panel.
Figure 11:
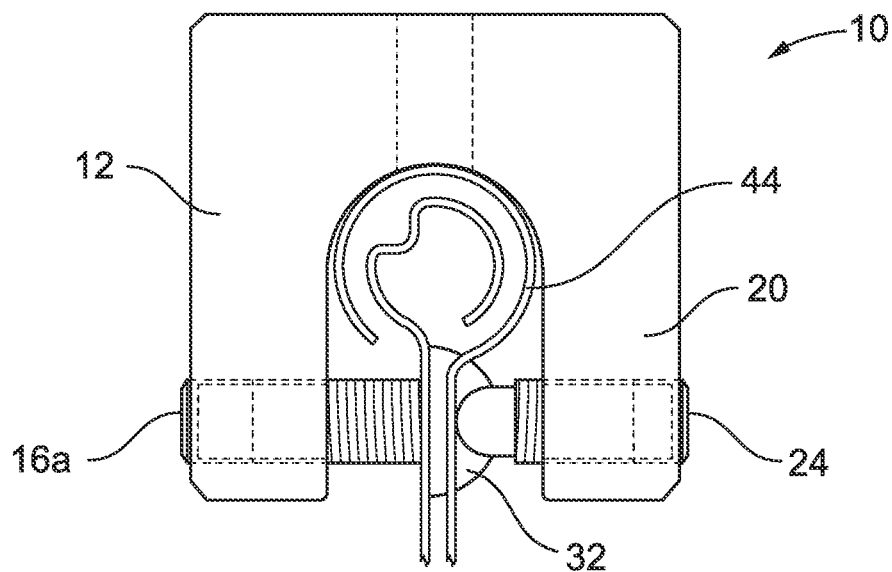
FIG. 11 is a front detail view of another embodiment of a roof mounting bracket installed on an alternative roof panel.

As seen in FIGS. 3-4, in one embodiment bracket 10 may further include, on the underside of the top wall 26, a notch 28 for aligning the seam 44. As seen in FIGS. 9-11, bracket 10 can be configured for use with various types of seams 44. In other embodiments, width of bracket 10 can vary to accommodate wider seams 44, first wall 12 and second wall 20 can vary in thickness, and void can be shaped to fit rounded seams 44. Other variations in bracket 10 shape and configuration are also contemplated to suit the installation needs for particular roof systems and the various accessories to be mounted thereto.

Figure 12:
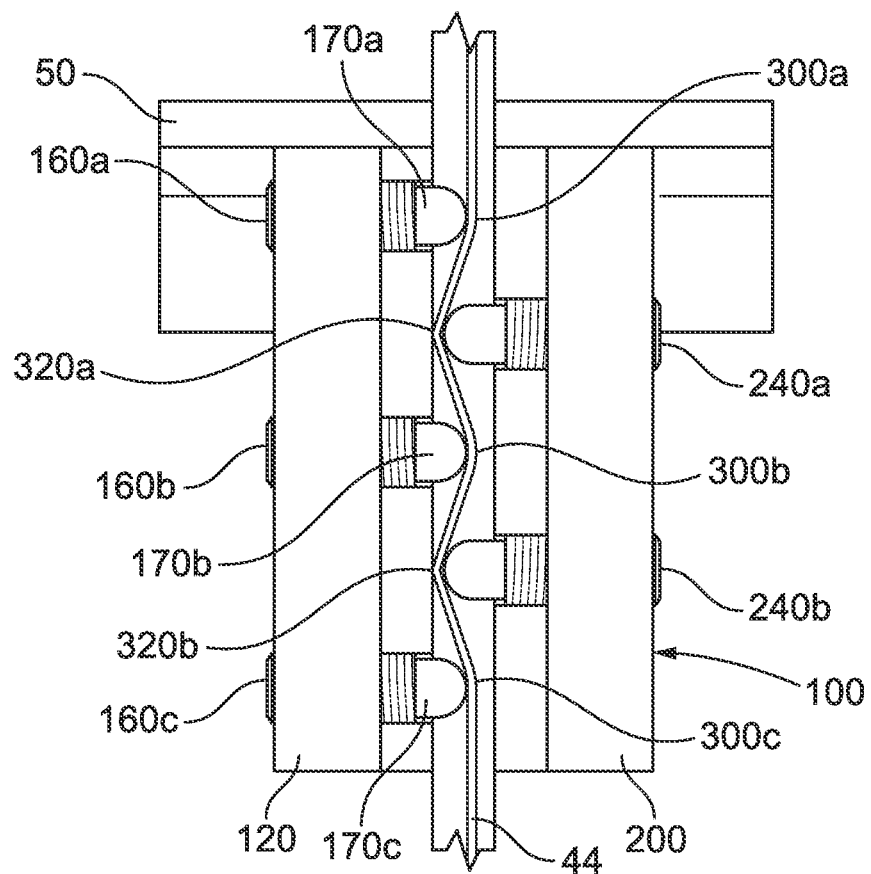
FIG. 12 is a front detail view of an alternative embodiment of a roof mounting bracket installed on a roof panel.
Figure 13:
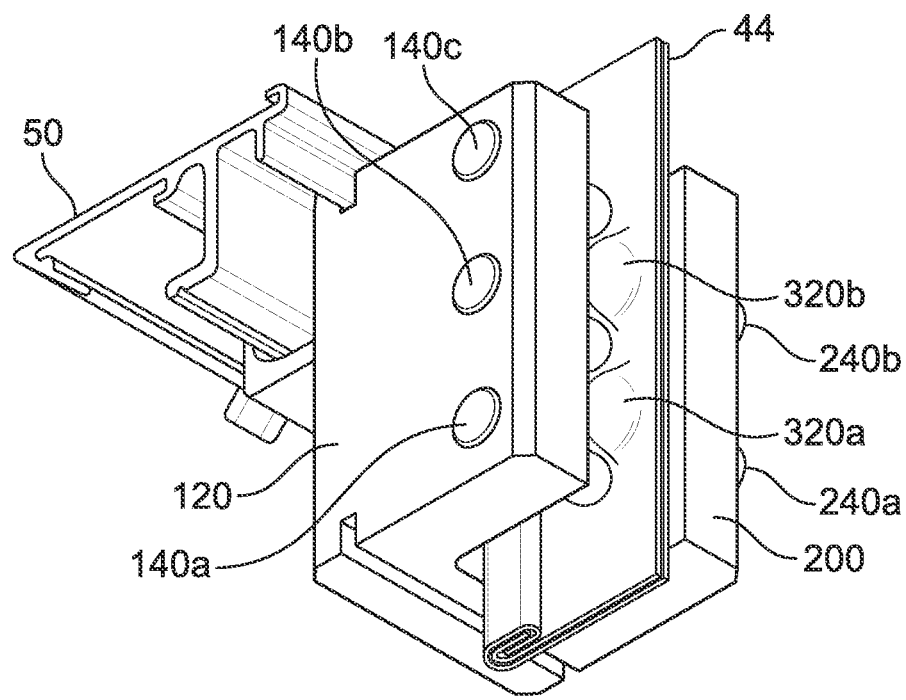
FIG. 13 is a bottom perspective view of the embodiment of the roof mounting bracket of FIG. 12 installed on a roof panel and further including a snow barricade coupled to bracket.
Figure 14:
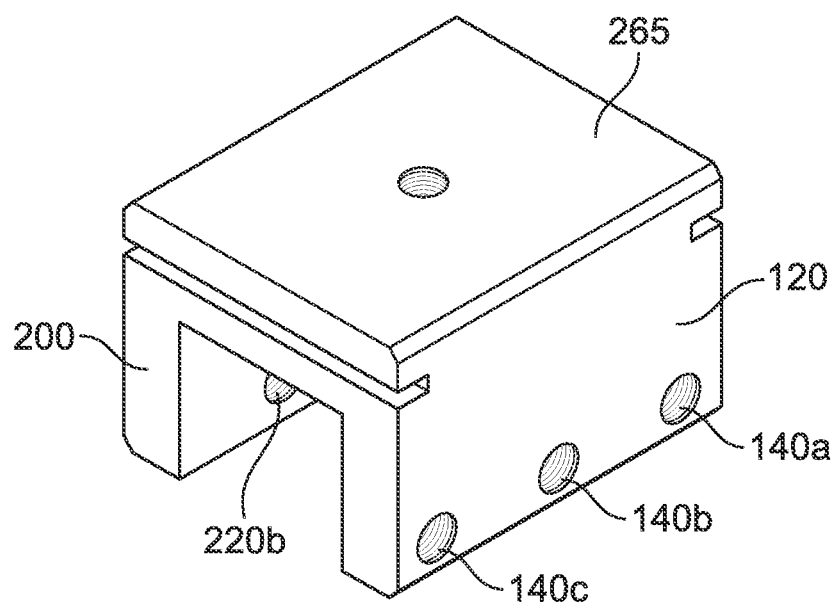
FIG. 14 is a perspective view of the embodiment of the roof mounting bracket of FIG. 12.

In alternative contemplated embodiments, the bracket can include varying numbers of fasteners in arms of bracket for creating additional wave deformations in panel seam using additional opposing screws. As seen in the embodiment in FIGS. 12-14, bracket 100 can include three fasteners 140a, 140b, 140c in first arm 120 and two fasteners 220a, 220b in the second arm 200 for creating additional deformations 300a, 300b, 300c and 320a, 320c in the seam 44. Creating additional deformations creates a stronger hold of the bracket 100 on the panel 40 by further preventing slide of the bracket on the panel 40. To secure the bracket 100 to the panel 40, the void in the bracket 100 is placed over the seam 44 with the first arm 120 on a first side of the seam 44 and the second arm 200 on the opposite side of the seam 44. First screws 160a, 160b, 160c are inserted into fasteners 140a, 140b, 140c and threaded therethrough until the heads 170a, 170b, 170c contact the seam 44, slightly engaging the seam 44 and creating first deformations 300a, 300b, 300c in the seam 44 as the screws 160a, 160b, 160c are tightened. Second screws 240a, 240b are then inserted into second fasteners 220a, 220b and threaded therethrough until heads 250a, 250b contact the opposing side of seam 44 in the spaces between the first deformations 300a, 300b, 300c, engaging the seam 44 and creating second opposing deformations 320a, 320b in the seam 44 as the second screws 240a, 240b are tightened. The opposing deformations 300a, 300b, 300c and 320a, 320b create two "wave"-shaped distortions in the seam 44, securing the bracket 10 to the seam 44. Also contemplated are additional fasteners in arms of bracket for creating additional wave deformations in panel using additional opposing screws.

Figure 15A:
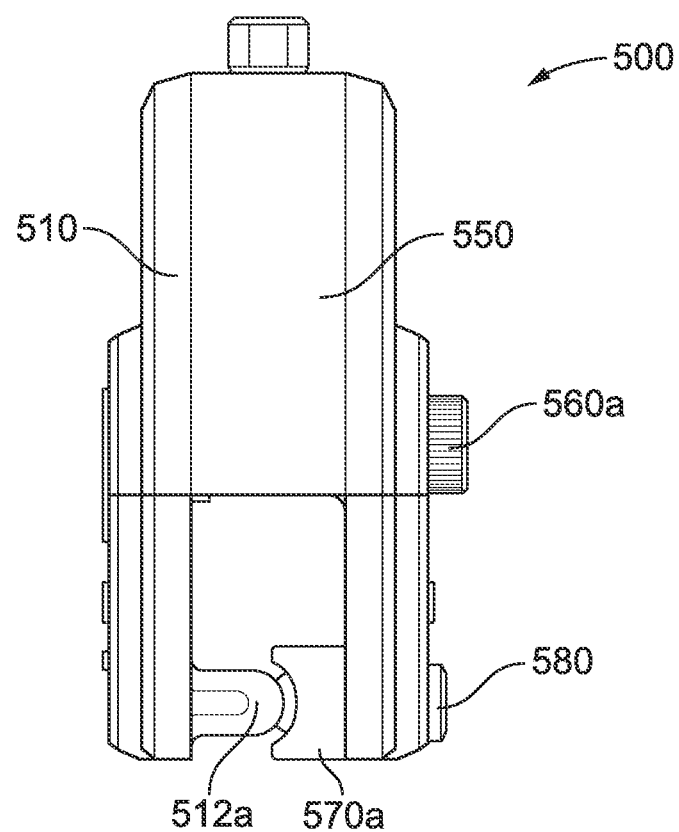
FIG. 15A is side view of an alternative embodiment of a roof mounting bracket in accordance with the present invention.
Figure 15B:
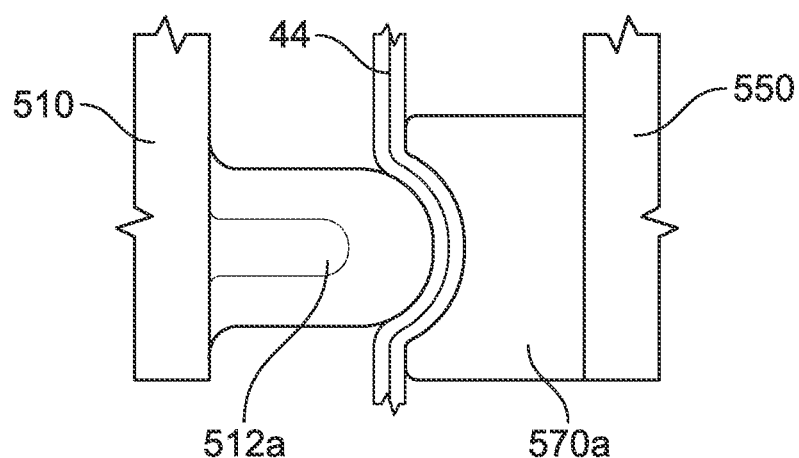
FIG. 15B is a detail view of a portion of the bracket in the embodiment in FIG. 15A, installed on a roof panel.
Figure 16:
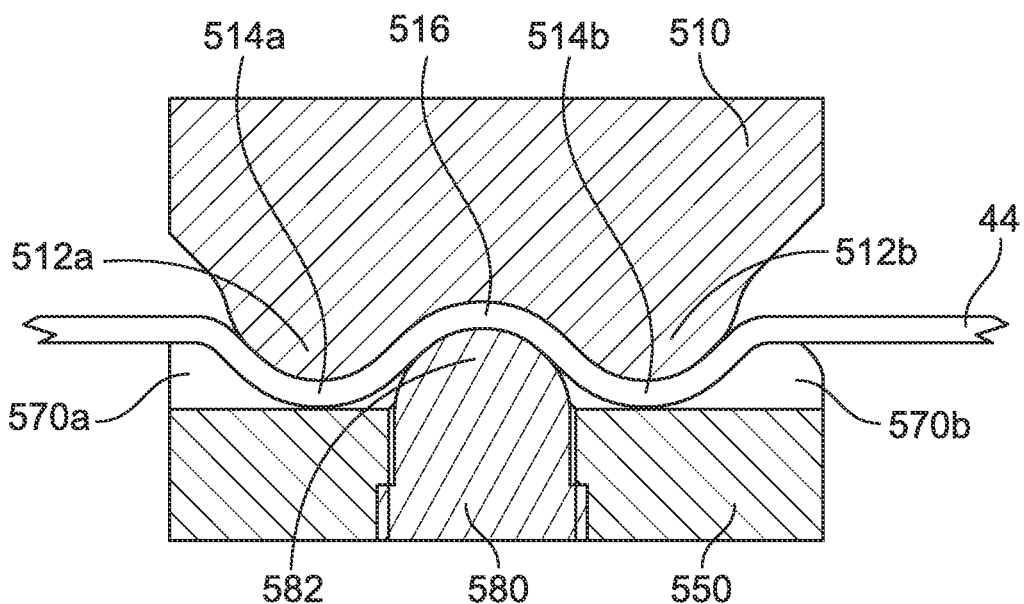
FIG. 16 is a cross-sectional view of the embodiment of a roof mounting bracket of FIG. 15A, installed on a roof panel.
Figure 17:
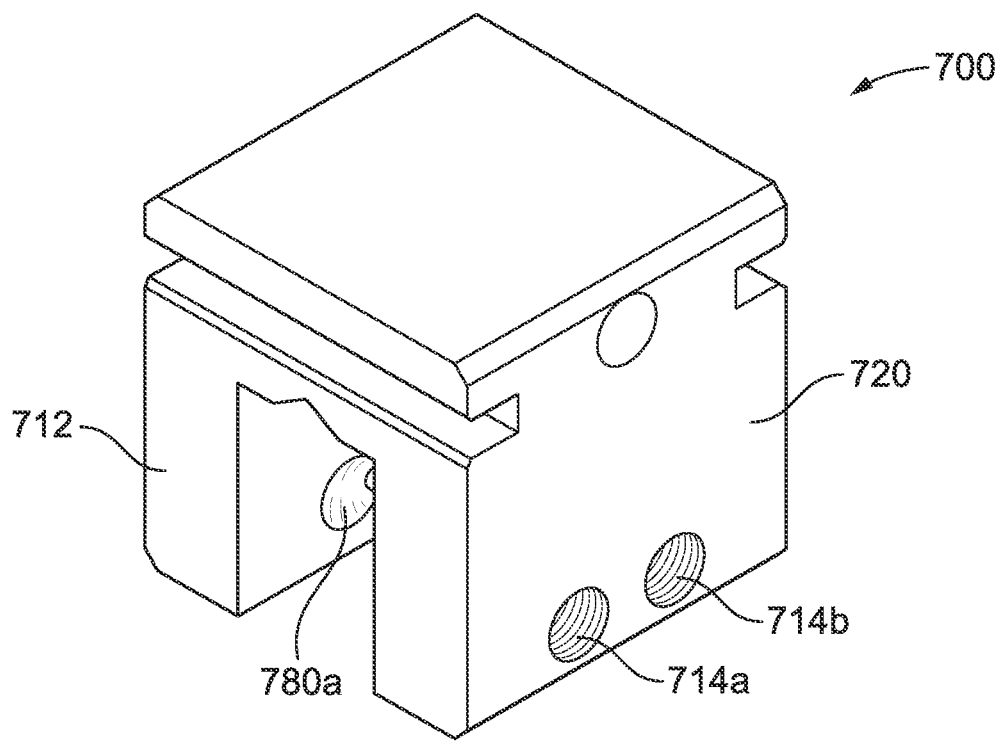
FIG. 17 is a perspective view of an another embodiment of a roof mounting bracket in accordance with the present invention.
Figure 18:
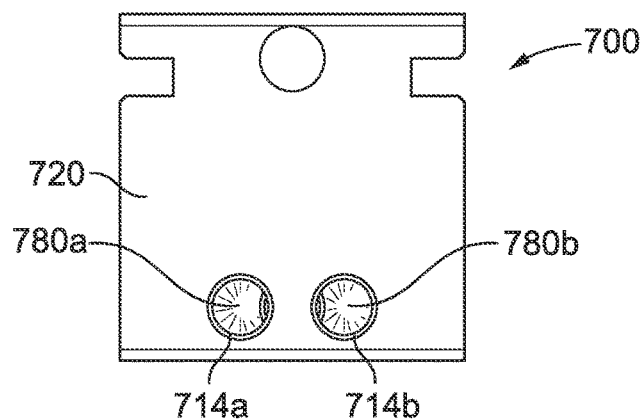
FIG. 18 is a side view of the embodiment of the roof mounting bracket of FIG. 17.
Figure 19:
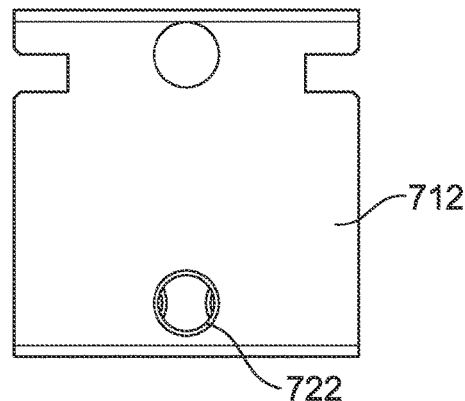
FIG. 19 is an opposite side view of the embodiment of the roof mounting bracket of FIG. 17.
Figure 20A:
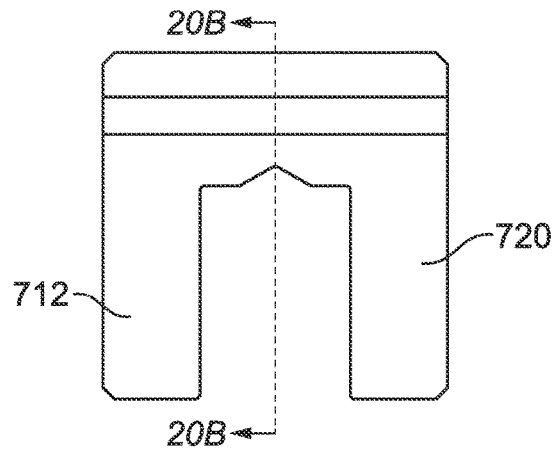
FIG. 20A is a front view of the embodiment of the roof mounting bracket of FIG. 17.
Figure 20B:
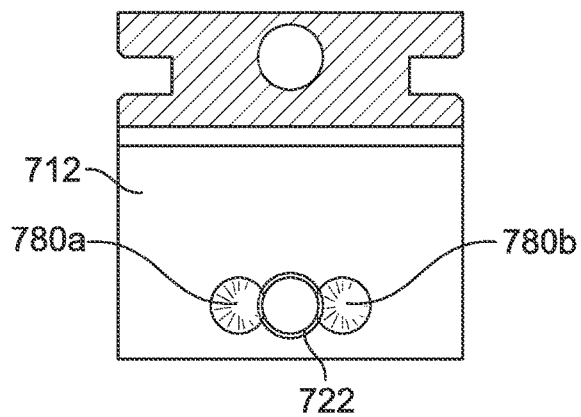
FIG. 20B is a section view along line 20B of FIG. 20A.
Figure 21:
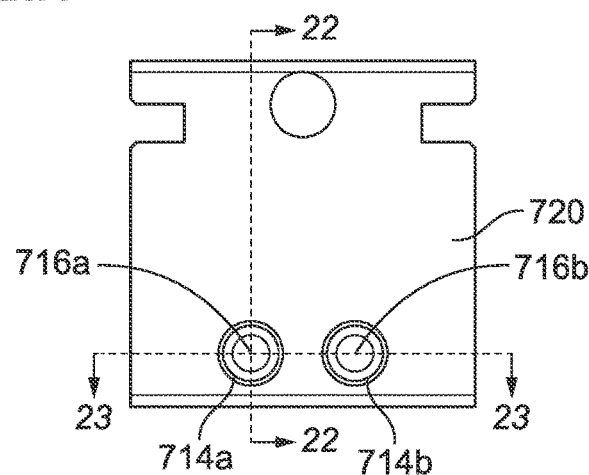
FIG. 21 is a side view of the embodiment of the roof mounting bracket of FIG. 17 with set screws threaded in fasteners.
Figure 22:
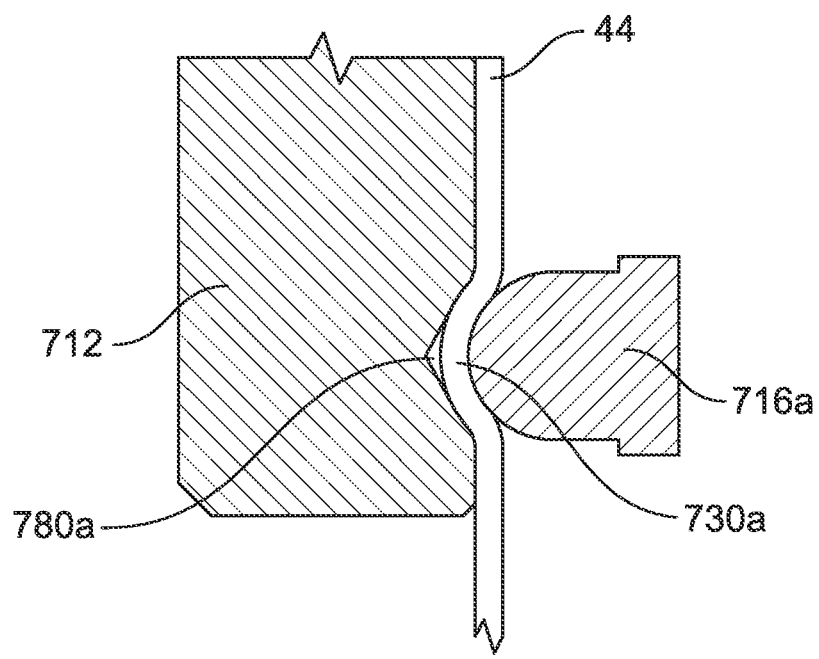
FIG. 22 is a cross-sectional view along line 22 of FIG. 21 of a set screw creating a first deformation recessed into a divot.
Figure 23:
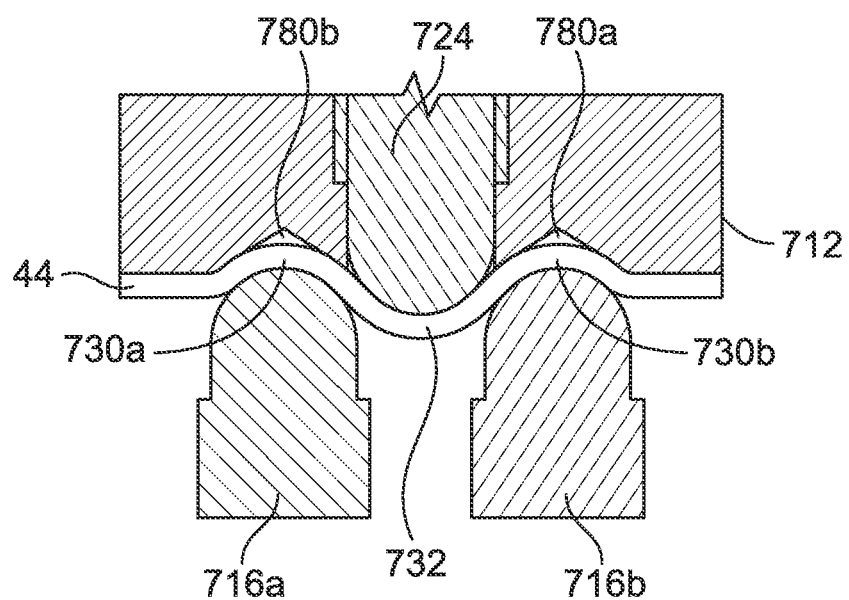
FIG. 23 is a cross-sectional view along line 23 of FIG. 21.

In a further alternative embodiment shown in FIGS. 15A, 15B and 16, bracket 500 is comprised of first member 510 and second member 550. First 510 and second 550 members are placed on either side of seam 44 and secured together using first screws 560a, 560b (not shown) which are threaded through fasteners (not shown) in second member 550 and engaged to fasteners (not shown) in first member 510 to secure first 510 and second 550 members together around seam 44. In the embodiment shown in FIGS. 15-16, the first member 510 comprises two posts 512a, 512b. Second member 550 comprises corresponding receiving channels 570a, 570b. Posts 512a, 512b create first deformations 514a, 514b in seam 44 as first screws 560a, 560b are tightened and deformations reset into receiving channels 570a, 570b to secure first 510 and second 550 members together around the seam 44. The second member 550 includes a third fastener (not shown) through which second screw 580 passes. As second screw 580 is tightened, the screw head 582 engages the seam 44 in the space between the deformations 514a, 514b on the opposite side of the seam 44, engaging the seam 44 and creating second deformation 516 in the seam 44 as the screw 580 is tightened. The opposing deformations 514a, 514b and 516 create a "wave"-shaped distortion in the seam 44, securing the bracket 500 to the seam 44. The opposing deformations 514a, 514b and 516 allow secure attachment of the bracket 10 to the seam 44 without having to "dimple" or dent the seam 44 using a single set screw, requiring less force by the user. In alternative contemplated embodiments, bracket 500 can include varying numbers of feet in first arm 510 of bracket 500 for creating additional wave deformations in seam 44. For example (not shown) first arm 510 could comprise three feet to create three first deformations in panel as first screws are tightened to secure first 510 and second 550 members together around the seam 44. Second arm 550 could comprise two fasteners through which two screws pass such that screw heads create contact the panel on the opposite side of the panel in the spaces between the first deformations, engaging the seam 44 and creating two second deformations in the seam 44 as the screws are tightened. The opposing deformations in this embodiment would thus create two "wave"-shaped distortions in the seam 44, securing the bracket 500 to the seam 44. In a preferred embodiment, the manufacturing of bracket 500 is done by die casting, with additional holes being drilled and tapped as a secondary operation through a CNC machine, and then trimmed, deburred and tumbled for a smooth finish on the final product.

In another embodiment shown in FIGS. 17-23, the bracket 700 includes two or more divots 780a, 780b on the inside of the first arm 712. The divots 780a, 780b are positioned opposite the threaded fasteners 714a, 714b of the second arm 720. The divots 780a, 780b are shaped to correspond to the heads of screws 716a, 716b, such that when the screws 716a, 716b are tightened to create first deformations 730a, 730b in the panel 44, the first deformations 730a, 730b reset into the divots 780a, 780b to create a more secure attachment of the bracket 700 to the panel 44. A second screw 724 is then inserted into the fastener 722 of the first arm 712 and threaded therethrough until the head 725 contacts the opposing side of the seam 44 in the space between the first deformations 730a, 730b, engaging the seam 44 and creating a second opposing deformation 732 in the seam 44 as the screw 724 is tightened to create the "wave"-shaped distortion in the seam 44, securing the bracket 700 to the seam 44.

Figure 24:
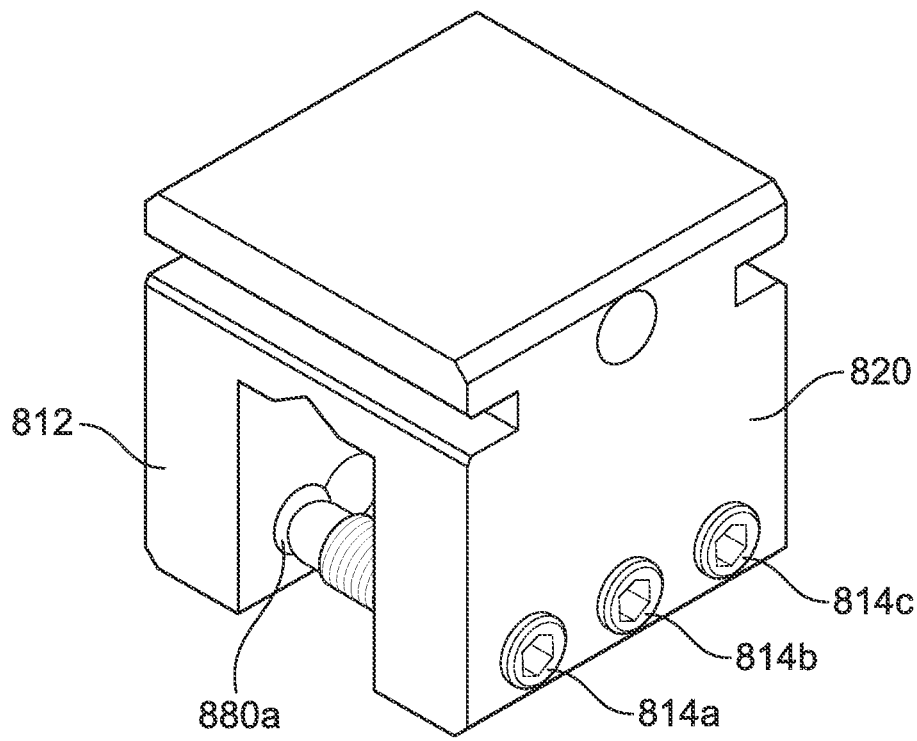
FIG. 24 is a perspective view of an alternative embodiment of a roof mounting bracket in accordance with the present invention.
Figure 25:
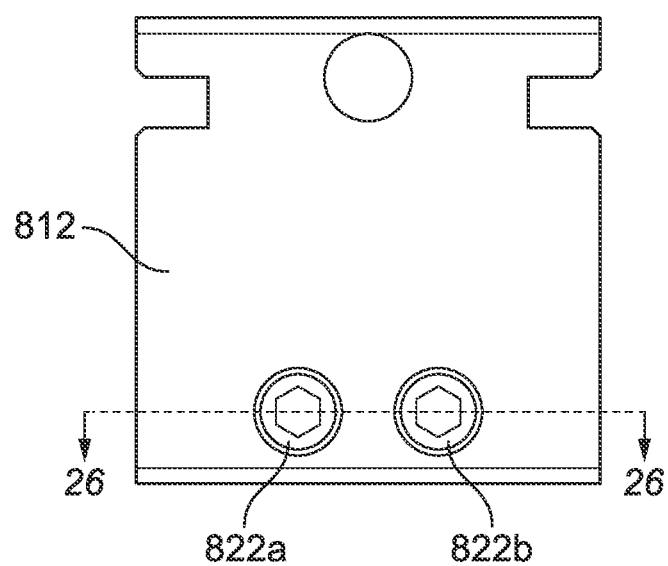
FIG. 25 is a side view of the embodiment of the roof mounting bracket of FIG. 25.
Figure 26:
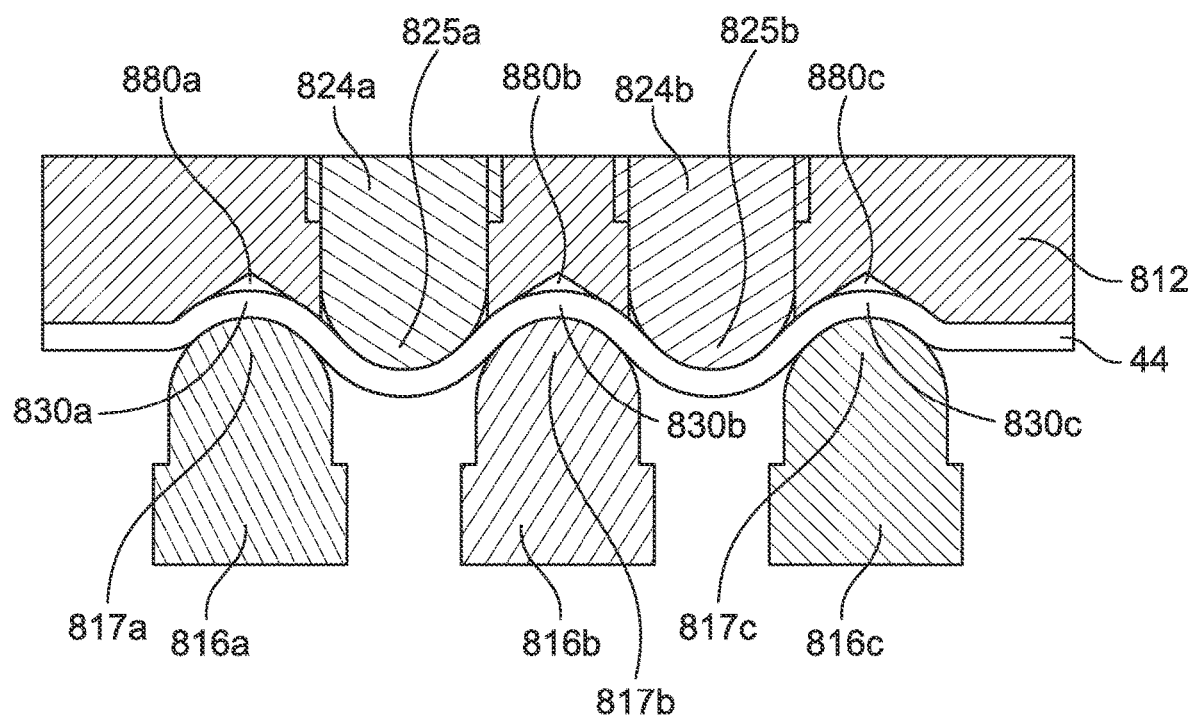
FIG. 26 is a cross-sectional view along line 27 of FIG. 26.

It is further contemplated that this embodiment of the bracket can include varying numbers of fasteners in arms of bracket and divots for creating additional wave deformations in panel seam using additional opposing screws. As seen in the embodiment in FIGS. 24-26, second arm 820 of bracket 800 can include three fasteners 814*a*, 814*b*, 814*c*. First arm 812 can include three divots 880*a*, 880*b*, 880*c* and two fasteners 822*a*, 822*b* for creating additional deformations 830*a*, 830*b*, 830*c* and 832*a*, 832*b* in the seam 44. Creating additional deformations creates a stronger hold of the bracket on the panel by further prevention for slide of the bracket on the panel. To secure the bracket 800 to the seam 44, the void in the the bracket 800 is placed over the seam 44 with the first arm 812 on a first side of the seam 44 and the second arm 820 on the opposite side of the seam 44. First screws 816*a*, 816*b*, 816*c* are inserted into fasteners 814*a*, 814*b*, 814*c* and threaded therethrough until the heads 817*a*, 817*b*, 817*c* contact seam 44, slightly engaging the seam 44 and creating first deformations 830*a*, 830*b*, 830*c* in the seam 44 as the screws 816*a*, 816*b*, 816*c* are tightened. The first deformations 830*a*, 830*b*, 830*c* reset into the divots 880*a*, 880*b*, 880*c*, allowing the panel 44 to be secured more firmly to the first arm 812. Second screws 824*a*, 824*b* are then inserted into second fasteners 822*a*, 822*b* and threaded therethrough until the heads 825*a*, 825*b* contact the the opposing side of the seam 44 in the spaces between the first deformations 830*a*, 830*b*, 830*c*, engaging the seam 44 and creating second opposing deformations 832*a*, 832*b* in the seam 44 as the second screws 824*a*, 824*b* are tightened. The opposing deformations 830*a*, 830*b*, 830*c* and 832*a*, 832*b* create two "wave"-shaped distortions in the seam 44, securing the bracket 800 to the seam 44. Also contemplated are additional fasteners in arms of bracket and additional corresponding divots for creating additional wave deformations in the panel using additional opposing screws.

Figure 27:
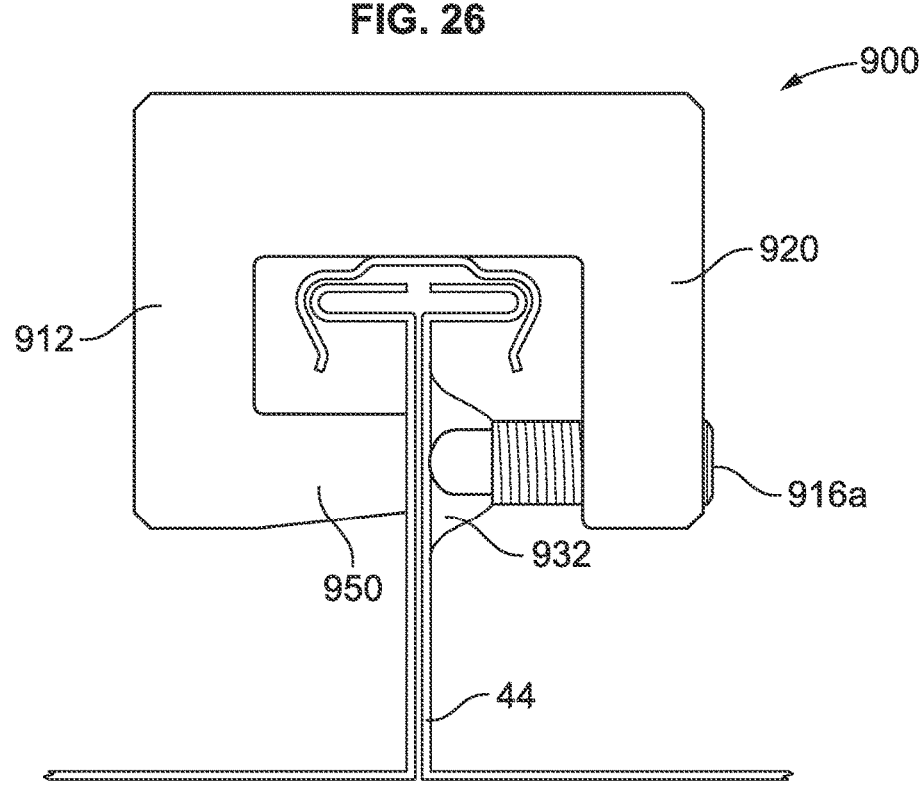
FIG. 27 is a front view of a further alternative embodiment of a roof mounting bracket in accordance with the present invention, installed on a panel seam.
Figure 28:
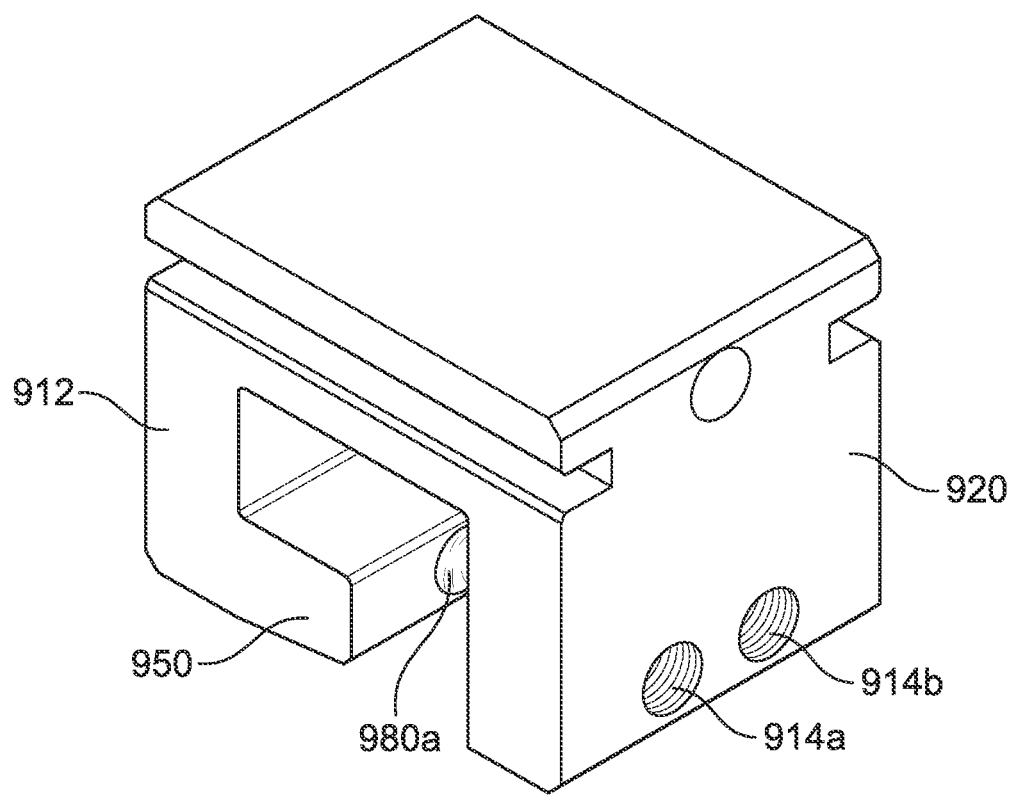
FIG. 28 is a perspective view of the embodiment of the roof mounting bracket of FIG. 28.

In a further alternative embodiment shown in FIGS. 27-28, bracket 900 can include an extrusion portion 950 extending from the first arm 912 into the opening between the first arm 912 and the second arm 920. The extrusion portion 950 aids in centering the bracket 900 on the seam 44, and can be shaped to fit varying configurations of seams 44. Similar to the embodiments described above, divots 980*a*, 980*b* (not shown) are positioned opposite the threaded fasteners 914*a*, 914*b* of the second arm 920. The divots 980*a*, 980*b* are shaped to correspond to heads of screws 916*a*, 916*b* (not shown), such that when screws 916*a*, 916*b* are tightened to create first deformations (not shown) in panel 44, deformations reset into divots 980*a*, 980*b* (not shown) to create a more secure attachment of bracket 900 to panel 44. Second screw (not shown) is then inserted into fastener (not shown) and threaded therethrough until head contacts the opposing side of the seam 44 in the space between the deformations (not shown), engaging the seam 44 and creating a second opposing deformation 932 in the seam 44 as the screw is tightened to create the "wave"-shaped distortion in the seam 44, securing the bracket 900 to the seam 44. Extrusion portion 950 could also be coupled to second arm 920 (not shown) to accommodate varying seam 44 configurations, and could have varying shapes and dimensions to accommodate varying seam 44 configurations.

Figure 29:
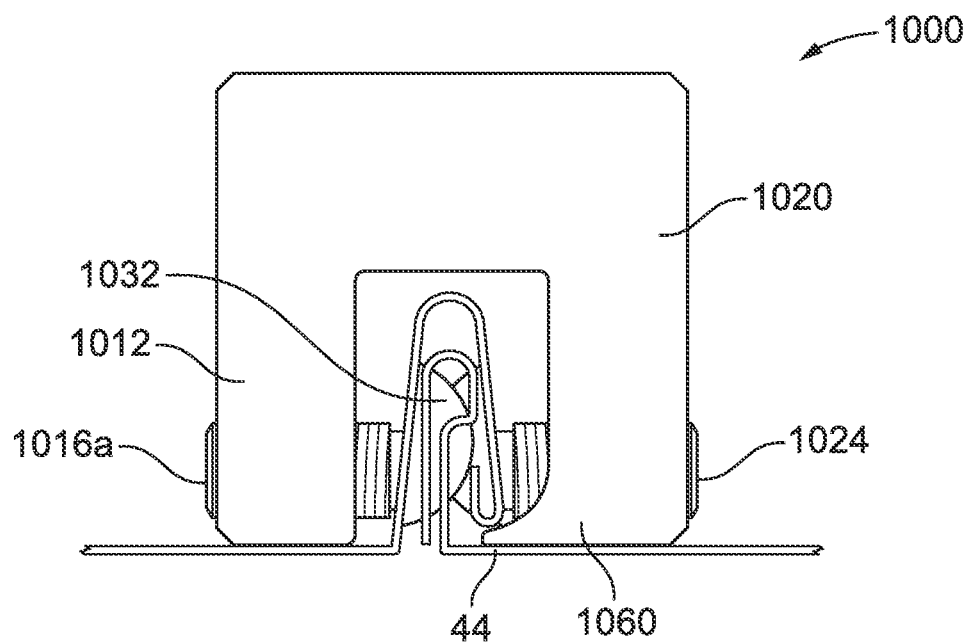
FIG. 29 is a front view of a further alternative embodiment of a roof mounting bracket in accordance with the present invention, installed on a panel seam.

In yet a further embodiment seen in FIG. 29, bracket 1000 may include a lip 1060 extending from second arm 1012 which can hook under a portion of the panel seam 44 to prevent the bracket 1000 from riding up the seam 44 as the set screws 1016*a*, 1016*b* (not shown) and 1024 are torqued to create first deformations (not shown) and opposing "wave" deformation 1032. Lip 1060 could also be coupled to first arm 1012 (not shown) to accommodate varying seam 44 configurations, and could have varying shapes and dimensions to accommodate varying seam 44 configurations.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A roof mounting bracket for securing accessories to seamed panel roof systems, the roof mounting bracket being mounted on a roof panel seam in a manner that creates a generally wave-shaped distortion in the roof panel seam, the roof mounting bracket comprising:
   a first member, the first member having coupled thereto two or more first projections disposed on a first side of the roof panel seam, wherein the two or more first projections define a space between each of the two or more first projections;
   a second member disposed opposite the first member on an opposite side of the roof panel seam, the second member having coupled thereto one or more second projections, wherein the one or more second projections are positioned opposite the space defined between the two or more first projections;
   wherein the two or more first projections are movable relative to the first member to engage the first side of the roof panel seam to create two or more first deformations in the roof panel seam;
   wherein the one or more second projections are movable relative to the second member to engage the opposite side of the roof panel seam to create one or more second deformations in the roof panel seam in the spaces defined between the two or more first deformations, thereby creating the generally wave-shaped distortion of the roof panel seam;
   wherein the two or more first projections and the one or more second projections comprise screws, and each screw has a head;
   wherein the screws are coupled to the first member and the second member by threaded fasteners formed in the first member and the second member; and
   wherein the heads of each of the screws directly engage the roof panel seam and create the first two or more deformations and the second one or more deformations in the roof panel seam and create the generally wave-shaped distortion in the roof panel seam,
   wherein a top of the first member and a top of the second member are attached to a third member, defining a generally U-shaped bracket wherein the two or more first projections and the one or more second projections extend into the space defined by the first member, the second member, and the third member, and wherein the space is configured to receive the roof panel seam; and
   a notch in third member for aligning the roof panel seam within space.

2. The roof mounting bracket of claim 1 wherein the bracket is comprised of aluminum.

3. The roof mounting bracket of claim 1 wherein the bracket is comprised of brass.

4. The roof mounting bracket of claim 1, further including a roof accessary, wherein the third member comprises one or more fasteners for securing said roof accessory thereto.

5. The roof mounting bracket of claim 4 wherein the roof accessory comprises a snow barricade mounting system.

6. The roof mounting bracket of claim 4 wherein the roof accessory comprises a solar panel mounting system.

7. The roof mounting bracket of claim 4 wherein the roof accessory comprises a signage mounting system.

8. The roof mounting bracket of claim 4 wherein the roof accessory comprises a lightening protection system.

9. A roof mounting bracket for securing accessories to seamed panel roof systems, the roof mounting bracket being mounted on a roof panel seam in a manner that creates a generally wave-shaped distortion in the roof panel seam, the roof mounting bracket comprising:
- a first arm including at least a first threaded hole and a second threaded hole, wherein said first arm is disposed on a first side of said roof panel seam;
- a first screw coupled to said first threaded hole, wherein said first screw is movable relative to the first arm within said first threaded hole to extend beyond said first arm towards said first side of said roof panel seam when said screw is rotated;
- a second screw coupled to said second threaded hole, wherein said second screw is movable relative to the first arm within said second threaded hole to extend beyond said first arm towards said first side of said roof panel seam when the second screw is rotated, said first and second threaded holes define a space between said first and second screws;
- a second arm including a third threaded hole, wherein said second arm is disposed on a second side of said roof panel seam; and
- a third screw coupled to said third threaded hole and movable relative to the second arm to extend beyond said second arm towards said second side of said roof panel seam when said third screw is rotated,
wherein said third threaded hole is positioned opposite said space defined between said first and second screws,
wherein rotating said first or said second screws within said first and second threaded holes to engage said first side of said roof panel seam creates first and second deformations in said roof panel seam, and rotating said third screw within said third threaded hole to engage said second side of said roof panel seam creates a third deformation in said roof panel seam within said space defined between said first and said second deformations, creating said generally wave-shaped distortion of the roof panel seam,
wherein said first, second, and third screws have a head and the heads of said first, second, and third screws directly engage the roof panel seam and create said first, second, and third deformations in the roof panel seam and create the generally wave-shaped distortion in the roof panel seam,
wherein a top of said first arm and a top of said second arm are attached to a third wall, defining a generally U-shaped bracket wherein said first, said second, and said third screws extend into a second space defined by said first arm, said second arm, and said third wall, and wherein said second space is configured to receive said roof panel seam, and
a notch in said third wall for aligning said roof panel seam within said second space.

10. The roof mounting bracket of claim 9, wherein the bracket is comprised of aluminum.

11. The roof mounting bracket of claim 9, wherein the bracket is comprised of brass.

12. The roof mounting bracket of claim 9, wherein said third wall comprises one or more fasteners for securing a roof accessory thereto.

13. The roof mounting bracket of claim 12, further including a roof accessory secured to said one or more fasteners.

14. The roof mounting bracket of claim 13, wherein said roof accessory comprises a snow barricade mounting system.

15. The roof mounting bracket of claim 13, wherein said roof accessory comprises a solar panel mounting system.

16. The roof mounting bracket of claim 13, wherein said roof accessory comprises a signage mounting system.

17. The roof mounting bracket of claim 13, wherein said roof accessory comprises a lightning protection system.

* * * * *